Sept. 18, 1951    M. PEDERSEN    2,568,088
CHUCK
Filed Nov. 18, 1949
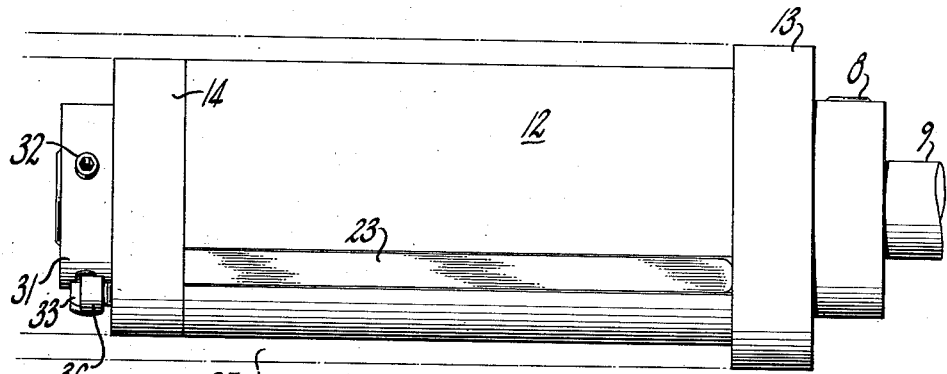
FIG_1_
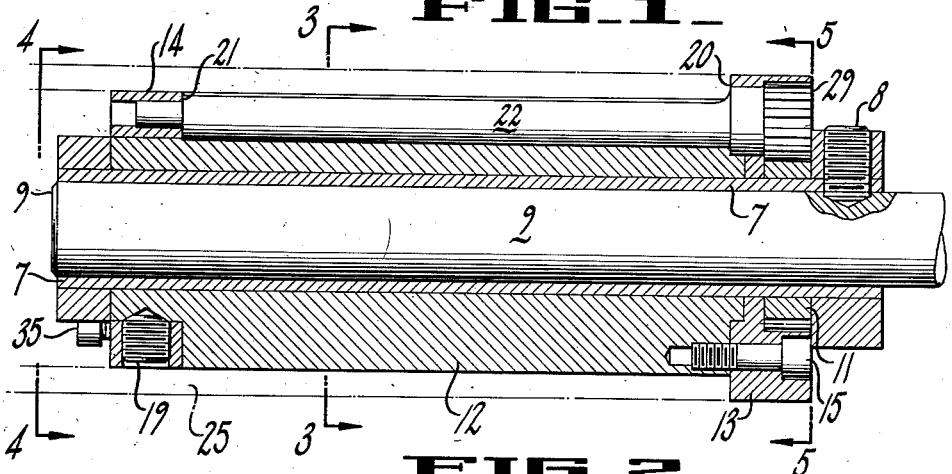
FIG_2_
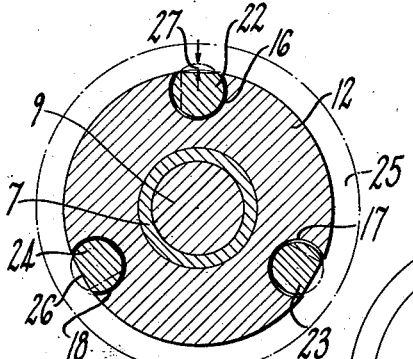
FIG_3_
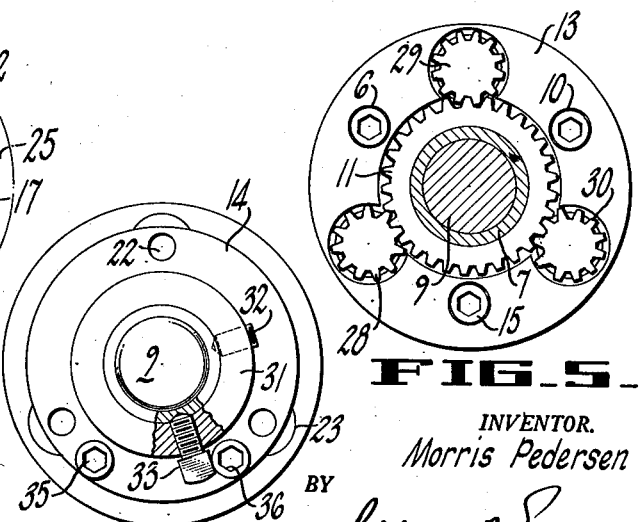
FIG_4_    FIG_5_
INVENTOR.
Morris Pedersen
BY
ATTORNEY Patented Sept. 18, 1951

2,568,088

UNITED STATES PATENT OFFICE 2,568,088

CHUCK

Morris Pedersen, San Francisco, Calif., assignor to Paterson Pacific Parchment Company, a corporation of California Application November 18, 1949, Serial No. 128,114

3 Claims. (Cl. 279—2)

This invention relates to a new and novel form of chuck, which is particularly suited to some of the specialized requirements of the paper industry. It will therefore be described as it has been particularly adapted for use in that industry, although it is not, obviously, limited to this in its application.

In the handling of paper it is usual to wind it upon a tubular core formed of paper. Because of the compressible nature of the tubes, the chucks used for gripping them must be capable of applying an adequate gripping pressure without distortion or breakage of the cores because these are commonly repeatedly re-used.

An object of this invention is to provide a chuck which applies a uniform gripping pressure over a relatively large area to minimize the distortion of the tubular members. The intensity of gripping force per unit area has been reduced in my new form of chuck by a novel design which allows for much larger gripping area in a given chuck than was formerly possible with previous designs. In addition to a larger gripping surface, the new form of chuck minimizes gripping intensities by automatically applying only as much pressure as is needed to produce rotation of the paper core and the roll of paper wound thereon. A combination of these two characteristics makes this chuck uniquely suitable for handling various type of paper rolls. A light but adequate grip is placed automatically on thin tubes carrying delicate tissue paper, while the same chuck automatically adjusts to the stronger grip needed to overcome the inertia of a heavy roll of newsprint. In either case, the tube is only gripped by the amount needed to induce rotation.

Another object of this invention is to provide a chuck which is capable of producing gripping action in either rotational direction. Often in paper processing it is desirable to be able to perform both a wind and a rewind operation with one setting of the tubular core.

A further object of my invention is a chuck with a greatly increased ease of disengagement. Because of the novel method of producing a gripping action in the chuck of the present invention, the motion needed for disengagement has been reduced from the several complete rotations required by the chucks employed heretofore to a rotation over an arc of but a few degrees. My chuck is of rugged characteristics, easily manufactured and offers certainty in gripping action. Although this chuck is particularly adapted to the needs of the paper industry, the teachings of this invention should not be narrowly confined to that field, as it is expected that many uses will be found for a chuck having the desirable characteristics described below.

In the drawings, Figure 1 illustrates a longitudinal plan view of a present preferred embodiment of the chuck.

Figure 2 illustrates a longitudinal section of the chuck.

Figure 3 is a vertical section on the line 3—3 in Figure 2.

Figure 4 illustrates a plan view partially in section from line 4—4 in Figure 2.

Figure 5 is a section on line 5—5 of Figure 2.

My invention may be briefly characterized as comprising a chuck with two concentrically mounted sleeve-like members, the outer member being provided with gripping members and means provided between the two sleeve-like members for rotating the gripping members upon relative rotation between the two sleeve-like members.

In accordance with this invention, an inner sleeve 7 is secured as by set screw 8 to a suitable driver element which is driven by a prime mover, such element being shown as a drive shaft 9. Upon inner sleeve 7 is mounted solar gear 11 with an axis of rotation substantially coincident with the rotational axis of driveshaft 9. An outer cylindrical sleeve 12 is mounted for rotation about the inner sleeve 7, being mounted on flanges 13 and 14; flange 13 is secured to the outer sleeve by screws 6, 10 and 15, while flange 14 is secured to the opposite end of the outer sleeve by set screw 19. The diameter of the outer sleeve 12 is such that it fits snugly the inner surface of the core to be mounted upon the chuck.

The outer sleeve 12 is slotted to receive one or more core gripping members and, in the form illustrated, sleeve 12 is shown as slotted in three positions, 16, 17 and 18, spaced equidistant about the periphery of the sleeve. Journalled in these slots, as in bearings 20 and 21, are rotatable gripping members 22, 23 and 24. Each gripping member is provided with a planar surface 26 which, in the disengaged position of the clutch, is tangential to the outside surface of sleeve 12. Each gripping member is rotatable in each direction through about 90° to provide gripping pressure on a surrounding tubular member schematically illustrated as 25, through a radial distance indicated by line 27 in Figure 3.

Rotation of the gripping members is effected by solar gear 9 enmeshed with the planetary gears 28, 29 and 30 respectively, secured to the extremities of the gripping members 22, 23 and 24, upon relative rotation between the inner and the outer sleeve member. Flange 31 is secured on sleeve 7 by set screw 32 and said flange support stop 33. The relative angular rotation between the inner and outer sleeve is controlled by the engagement of stop 33 with stops 35 and 36 mounted on flange 14; in the form illustrated, stop 33 is so placed that the device is only operative upon counterclockwise rotation.

In operation, a tubular core member, indicated schematically at 25, is placed over the chuck while the chuck is in a stationary, disengaged position. Upon rotation of the drive-shaft 9, the inner member 7, being secured to the drive-shaft, rotates with the shaft. The outer member 12, being pivoted around the axis of rotation of the inner member and functionally connected to it by the sun and planet gears, does not start to rotate until the gripping members on the outer member have engaged the inner surface of the tubular core surrounding the outside member. When the gripping members are engaged with the core, the components of the structure rotate together. Because of the nature of the interconnection between the inner member and the outer member, only such pressure is applied to the tubular member as is needed to maintain the equal angular velocity of the three members.

While I have disclosed the device as including three gripping members, the number of these can be varied to supply the gripping pressure required for a given diameter of tubular core and the load to be transmitted. Thus, on a small core and under a light torsional force a single member will suffice, as either the core, the torsional force or both are increased, the number should be increased. Those skilled in the art can readily determine the number and area of gripping surface required to transmit a given torsional force to a given core and suit the gripping members to these factors.

I claim:

1. A chuck of the character described capable of gripping the inner surface of the tubular member comprised of a first member adapted to be rotated in a selected direction, a second member mounted for rotation about an axis concentric to the rotational axis of the first member and mounted about said first member, said second member being cylindrical and having spaced cylindrical receptacles therein extending longitudinally of the second member and opening onto the cylindrical surface of said second member to provide a narrow slot extending the length of said second member, cylindrical rotating gripping members disposed in said slots in the second member, said rotating gripping members having an axis of rotation substantially parallel to the concentric axis of rotation of said first and said second member, a pair of spaced flanges mounted on said second member and having said gripping members journalled therein, each of said gripping members having a gripping surface thereon substantially of the width of the narrow slot opening in the receptacle on which the gripping member is mounted and being movable between a first position wherein each of said gripping surfaces is in a plane substantially tangential to the outside cylindrical surface, and a second position wherein said gripping surface is in a plane substantially at right angles to said tangential plane, a solar gear mounted upon said first member with an axis of rotation substantially coincident to the axis or rotation of said first member, planetary gears mounted on said gripping members having an axis of rotation coincident with the axis of rotation of said gripping members, said solar gear and said planetary gear being intermeshed to rotate said gripping member in one direction upon relative rotation between said first and said second member in one direction and to rotate said gripping member in the opposite direction upon relative rotation in an opposite direction between said first and second member.

2. A chuck of the character described capable of gripping the inner surface of the tubular member comprised of a first member adapted to be rotated in a selected direction, a second member mounted for rotation about an axis concentric to the rotational axis of the first member and mounted about said first member, said second member being cylindrical and having spaced cylindrical receptacles therein extending longitudinally of the second member and opening onto the cylindrical surface of said second member to provide a narrow slot extending the length of said second member, cylindrical rotating gripping members disposed in said slots in the second member, said rotating gripping members having an axis of rotation substantially parallel to the concentric axis of rotation of said first and said second members, a pair of spaced flanges mounted on said first member and having said gripping members journalled therein, each of said gripping members having a planar surface thereon substantially of the width of the narrow slot opening in the receptacle on which the gripping member is mounted and being movable between a first position wherein each of said planar surfaces is in a plane substantially tangential to the outside cylindrical surface of said second member, and a second position wherein said planar surface is in a plane substantially at right angles with said tangential plane, a solar gear mounted upon said first member with an axis of rotation substantially coincident to the axis of rotation of said first member, planetary gears mounted on said gripping members having an axis of rotation coincident with the axis of rotation of said gripping members, said solar gear and said planetary gear being intermeshed to rotate said gripping members in one direction upon relative rotation between said first and said second member, in one direction and to rotate said gripping members in the opposite direction upon relative rotation in an opposite direction between said first and second members and means on said first and said second member to limit the extent of relative angular rotation between said first and said second member in either direction.

3. A chuck of the character described capable of gripping the inner surface of a tubular member comprised of a first member adapted to be rotated in a selected direction, a second member mounted for rotation about an axis concentric to the rotational axis of the first member, and mounted about said first member, said second member being cylindrical and having three cylindrical receptacles therein spaced equally about said second member and extending longitudinally of said second member, each of said receptacles opening onto the cylindrical surface of said second member to provide a narrow slot extending the length of said second member, three cylindrical rotating gripping members disposed in said slots in the second member, each of said rotating gripping members having a longitudinal axis substantially parallel to the concentric axis of rotation of said first and said second member, a pair of spaced flanges mounted on said second member and having said gripping members journalled therein, each of said gripping members having a planar surface thereon substantially of the width of the narrow slot opening in the receptacle on which the gripping member is mounted and being movable between a first position wherein each of said planar surfaces is in a plane substantially tangential to the outside cylindrical surface of said second member, and a second position wherein said planar surface is in a plane substantially at right angles to said tangential plane, a solar gear mounted upon said first member with an axis of rotation substantially coincident with the axis or rotation of said first member, planetary gears mounted on said gripping members having an axis of rotation coincident with the axis of rotation of said gripping members, said solar gear and said planetary gear being intermeshed to rotate said gripping members in one direction upon relative rotation between said first and said second member, in one direction and to rotate said gripping members in the opposite direction upon relative rotation in an opposite direction between said first and second members and means on said first and said second member to limit the extent of relative angular rotation between said first and said second member in either direction.

MORRIS PEDERSEN.

REFERENCES CITED

The following references are of record in the file of this patent:

UNITED STATES PATENTS

| Number | Name | Date |
| --- | --- | --- |
| 591,003 | Nawrath | Oct. 5, 1897 |
| 912,420 | Seven | Feb. 16, 1909 |

FOREIGN PATENTS

| Number | Country | Date |
| --- | --- | --- |
| 252,547 | Italy | Mar. 24, 1927 |